United States Patent Office 3,172,738
Patented Mar. 9, 1965

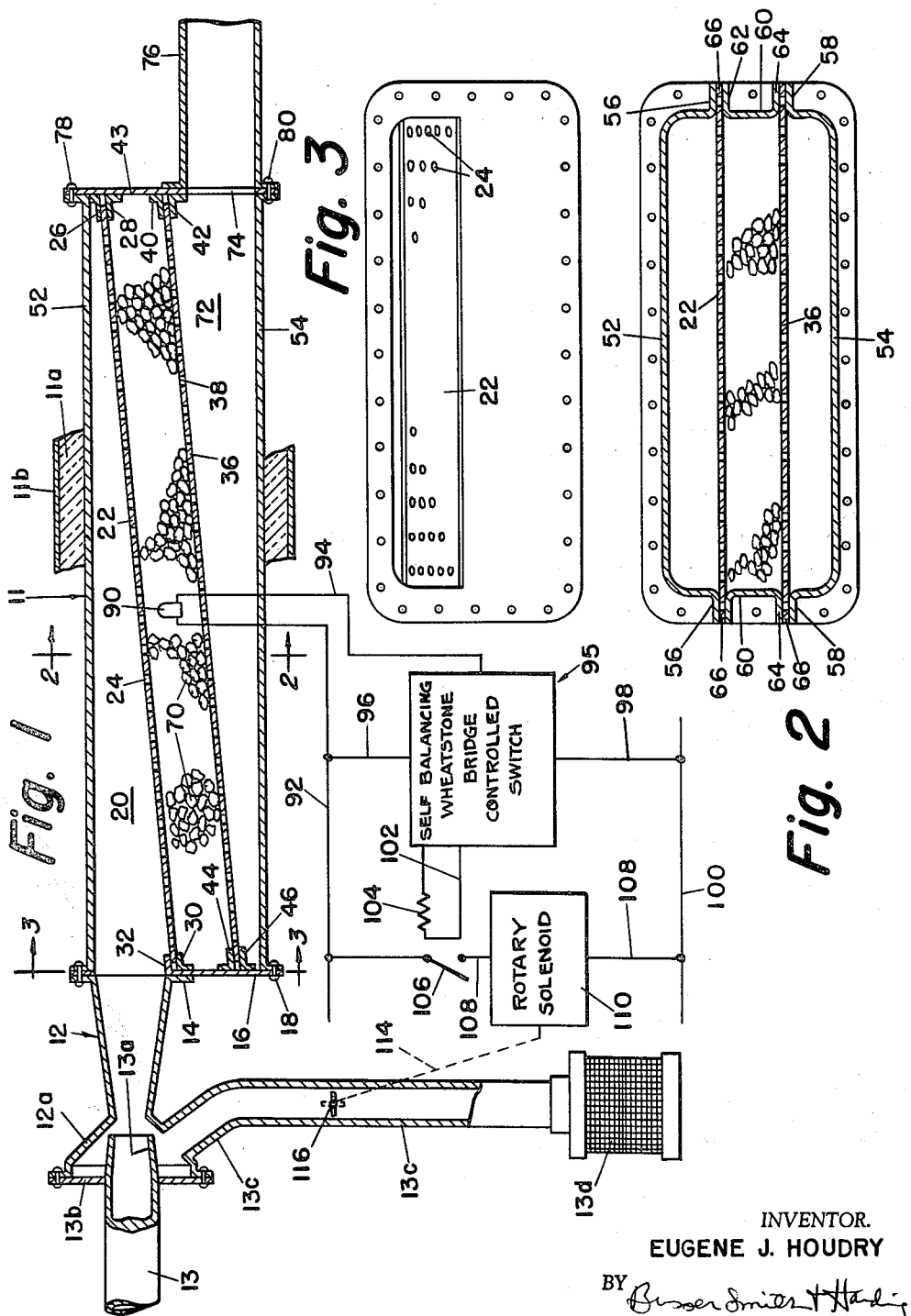

3,172,738
CATALYTIC EXHAUST PURIFIER FOR INTERNAL COMBUSTION ENGINES
Eugene J. Houdry, Ardmore, Pa., assignor to Oxy-Catalyst, Inc., Berwyn, Pa., a corporation of Pennsylvania
Filed May 12, 1960, Ser. No. 28,724
4 Claims. (Cl. 23—288)

This invention relates to a catalytic exhaust purifier for internal combustion engines. The purifier of this invention is particularly useful when employed with a gasoline engine in an automobile.

It is the broad object of this invention to provide a catalytic purifier for the elimination of hydrocarbons, oxygenated organic compounds and carbon monoxide from exhaust gases of internal combustion engines, particularly gasoline engines, and to provide such a purifier which is simple in construction and operation, of reasonable cost, relatively small in size and affording a high degree of elimination of these constituents over a reasonable period of time.

It has been known heretofore to provide a catalytic purifier for exhaust gases with a venturi which inspirates the air necessary to supply the oxygen for catalytically oxidizing the oxidizable constituents of the exhaust gases. In the case of automobile gasoline engines, the venturi functions to supply the desired amount of air for satisfactory operation of the catalytic purifier from idling to speeds of sixty miles per hour. However, when the automobile is driven at high speed such as over about 60 miles per hour and/or when the power jet of the carburetor functions to bring the air-fuel ratio to between 12:1 and 13:1, the exhaust gas temperature becomes relatively high, for example 1250° F. to 1450° F. and the oxidizable constituents of the exhaust gas also become relatively high, resulting in undesirably high temperatures in the catalytic purifier of, for example, 1750° F. to 2000° F. At these high temperatures catalytic activity is destroyed and warping of the purifier structure occurs.

It is, therefore, a particular object of this invention to provide a catalytic exhaust purifier having air supply means which will automatically deliver an excess amount of air as needed to prevent the temperature of the catalyst bed from exceeding a predetermined maximum temperature.

These and other objects of this invention will become apparent on reading the following description in conjunction with the drawings in which:

FIGURE 1 is a vertical section through a catalytic converter in accordance with this invention and which is partially schematic;

FIGURE 2 is a vertical section taken on the plane indicated by the line 2—2 of FIGURE 1; and FIGURE 3 is an elevation taken on the plane indicated by the line 3—3 in FIGURE 1.

Referring particularly to FIGURE 1, there is disclosed an exhaust purifier having a longitudinal metal housing 11 covered by insulating material indicated at 11a which is contained by a metal casing 11b. Housing 11 is constructed of a suitable heat resistant metal such as stainless steel. A mixture of exhaust gases and air is introduced into housing 11 from a venturi air inspirator 12 connected to an engine exhaust pipe 13. Venturi air inspirator 12 is capable of supplying a substantial excess of air, advantageously 30% to 50% by volume, over and above the stoichiometric air required for complete oxidation of the oxidizable constituents of the exhuast gases. Pipe 13 has a reduced nozzle end 13a and has a flange 13b bolted to inspirator 12. Inspirator 12 has a portion 12a converging in the direction of gas flow, and a portion 12 diverging in the direction of gas flow. An air inlet conduit 13c having an air filter 13d is provided. The flared portion 13b of member 12 is flanged to housing 11 as indicated at 12 and welded at 14 to housing end plate 16 which is flanged to housing 11 as indicated at 18.

An inlet chamber 20 is formed between housing 11 and inlet grid 22. Inlet grid 22 is provided with substantially uniformly distributed openings 24 and is slidaby held at the ends by brackets 26 and 28 and brackets 30 and 32 welded on plates 43 and 16, respectively. Substantially evenly spaced from grid 22 is an outlet grid 36 having substantially uniformly spaced openings 38. Outlet grid 36 is retained slidably at either end by brackets 40 and 42 which are welded to housing end plate 43 and brackets 44 and 46 which are welded to end plate 16.

The sides of grids 24 and 36 are slidably supported by central portions of housing 11. These central portions are comprised of an upper U-shaped member 52 and a lower U-shaped portion 54. Member 52 is provided with lateral flanges 56 while member 54 is provided with lateral flanges 58. Centrally disposed members 60 are provided with upper flanges 62 and lower flanges 64. Spacer members 66 are disposed between flanges 56 and 62 and 58 and 64, respectively, the flanges and spacers being preferably joined permanently by seam welding. As best seen in FIGURE 2, inlet grid 22 is slidably supported between flanges 56 and 62 and outlet grid 36 is slidably supported between flanges 58 and 64.

As best seen in FIGURE 3, inlet grid 22 lies in a plane forming a substantial angle with the axis of flow of the gases through the inlet opening of housing 11, resulting in an inlet chamber 20 having a cross-sectional area which decreases from the point of introduction of the gases in the direction of flow of the gases.

Oxidation catalyst pellets 70 are contained between grids 22 and 36 for the oxidation of the exhaust gases. Pellets 70 may be by way of example activated alumina pellets impregnated with a metal or metal oxide such as platinum, copper, silver or copper oxide.

Outlet grid 36 with housing 54 forms a discharge or outlet chamber 72 which has a cross-sectional area which increases as it approaches outlet opening 74 through which the gases discharge into pipe 76 which is welded to end plate 43.

End plate 43 is flanged to housing 11 as indicated at 78 and 80.

Referring to FIGURE 1, a resistance thermometer 90 is buried in catalyst pellets 70 and has its input side connected to a power supply line 92 and its discharge side connected to line 94 which is connected to a self-balancing Wheatstone bridge controlled switch indicated at 95. Switch 95 is connected to power supply line 92 by a line 96 and is connected by line 98 to power return line 100. Switch 95 controls line 102 in which there is a relay coil 104 adapted to close relay switch 106 when energized. Relay switch 106 is in series in a line 108 connected to power supply line 92 and also connected to a rotary solenoid 110 which is in series with line 108. Line 108 is also connected to power return line 100. As schematically shown, rotary solenoid 110 is connected to a shaft indicated by line 114. A butterfly valve 116 is fixedly secured to shaft 114 inside conduit 13c. As shown in FIGURE 1, valve 116 is in the closed position partially blocking the flow of air through conduit 13c. Valve 116 closes off conduit 13c so as to restrict the flow of air to the relatively high capacity venturi so it will provide only the desired amount of air for normal driving conditions, i.e. at speeds from idling up to about 60 miles an hour, which is the amount of air required for the oxidation of the oxidizable constituents of the exhaust gases or a slight excess of up to about 5% by volume of air. If it is desired that the valve 116 will be opened at a predetermined temperature in the range of from about 1200° F. to 1300° F. so that sufficient air will be supplied to the venturi to supply a substantial excess of air, advantageously an excess of from about 30% to about 50% by volume of air, to keep the temperature in the converter below a harmful level. For purposes of illustration it will be assumed that it is desired to open valve 116 when the temperature of the catalyst reaches 1300° F. Thus, as the automobile reaches relatively high speeds over 60 miles an hour, the temperature of the catalyst will rise increasing the resistance in resistance thermometer 90 and causing rebalancing of the Wheatstone bridge controlled switch. When the temperature of the bed reaches 1300° F., the rebalancing operation of the Wheatstone bridge controlled switch will cause the switch to close thus energizing relay coil 104 and closing relay switch 106 to cause the energizing of rotary solenoid 110. The actuation of solenoid 110 causes shaft 114 to be rotated thus to open valve 116 to the position shown in dotted lines in FIGURE 1. This permits the venturi to operate at its full capacity and supply an amount of air in excess of the stoichiometric amount of air required and preferably sufficient to prevent the bed from reaching a temperature in excess of about 1350° F. Similarly when the temperature of the catalyst drops below 1300° F., valve 116 will be closed by the rebalancing operation of the Wheatstone bridge controlled switch to restore the venturi to normal operation.

What is claimed is:

1. A catalytic purifier for an internal combustion engine comprising an air supply conduit, means to draw air through said air supply conduit and admix it with exhaust gases, a valve partially blocking said conduit when closed to restrict the flow of air drawn by said means, a housing having an inlet opening connected to said means and an outlet opening, a catalyst bed in said housing interposed between said inlet and outlet openings to receive the admixed air and exhaust gases, temperature responsive means to open said valve to abruptly increase the flow of air through said conduit to provide a substantial excess of air for cooling when the temperature of said bed of oxidation catalyst reaches a predetermined temperature and to close said valve when said temperature drops below a predetermined temperature.

2. A catalytic purifier for an internal combustion engine comprising an air supply conduit, a venturi to draw air through said air supply conduit and admix it with exhaust gases, a valve partially blocking said conduit when closed to restrict the flow of air drawn by said venturi, a housing having an inlet opening connected to said means and an outlet opening, a catalyst bed in said housing interposed between said inlet and outlet openings to receive the admixed air and exhaust gases, temperature responsive means to open said valve to abruptly increase the flow of air through said conduit to provide a substantial excess of air for cooling when the temperature of said bed of oxidation catalyst reaches a predetermined temperature and to close said valve when said temperature drops below a predetermined temperature.

3. A catalytic purifier for an internal combustion engine comprising an air supply conduit, means to draw air through said air supply conduit and admix it with exhaust gases, a valve partially blocking said conduit when closed to restrict the flow of air drawn by said means, a housing having an inlet opening connected to said means and an outlet opening, a catalyst bed in said housing interposed between said inlet and outlet openings to receive the admixed air and exhaust gases, temperature responsive means to open said valve to abruptly increase the flow of air through said conduit to provide a substantial excess of air for cooling when the temperature of said bed of oxidation catalyst reaches a predetermined temperature in the range of from about 1250° F. to 1350° F. and to close said valve when said temperature drops below the predetermined temperature.

4. A catalytic purifier for an internal combustion engine comprising an air supply conduit, a venturi to draw air through said air supply conduit and admix it with exhaust gases, a valve partially blocking said conduit when closed to restrict the flow of air drawn by said venturi, a housing having an inlet opening connected to said means and an outlet opening, a catalyst bed in said housing interposed between said inlet and outlet openings to receive the admixed air and exhaust gases, temperature responsive means to open said valve to abruptly increase the flow of air through said conduit to provide a substantial excess of air for cooling when the temperature of said bed of oxidation catalyst reaches a predetermined temperature in the range of from about 1250° F. to 1350° F. and to close said valve when said temperature drops below the predetermined temperature.

References Cited by the Examiner

UNITED STATES PATENTS

| | | | |
|---|---|---|---|
| 1,875,024 | 8/32 | Kryzanowsky | 23—288.3 |
| 2,937,490 | 5/60 | Calvert | 60—30 |
| 2,991,160 | 7/61 | Claussen | 23—288.3 |
| 3,045,422 | 7/62 | Houdry | 23—288.3 X |

MORRIS O. WOLK, *Primary Examiner.*

MAURICE A. BRINDISI, *Examiner.*